United States Patent [19]
Madany et al.

[11] Patent Number: 5,987,512
[45] Date of Patent: *Nov. 16, 1999

[54] METHOD AND APPARATUS FOR ACCESS TO REMOTE GATEWAY SERVERS

[75] Inventors: Peter W. Madany, Fremont; Eduardo Pelegri-Llopart, Mountain View, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/662,838

[22] Filed: Jun. 12, 1996

[51] Int. Cl.$^6$ .............................. G06F 13/14; H04L 12/66
[52] U.S. Cl. ........................... 709/221; 709/249; 709/219
[58] Field of Search ................................. 707/102, 103; 709/683, 684, 205, 227, 230, 249, 220, 221, 222, 226, 252

[56] References Cited

U.S. PATENT DOCUMENTS

| | | | |
|---|---|---|---|
| 4,677,588 | 6/1987 | Benjamin et al. | 364/900 |
| 5,341,478 | 8/1994 | Travis, Jr. et al. | 395/683 |
| 5,499,371 | 3/1996 | Henninger et al. | 707/102 |
| 5,619,710 | 4/1997 | Travis, Jr. et al. | 395/683 |

OTHER PUBLICATIONS

Computer Dictionary: Second Edition, Microsoft Press, p. 182, Jan. 1995.

*Primary Examiner*—Alvin E. Oberley
*Assistant Examiner*—Gary S. Fourson
*Attorney, Agent, or Firm*—Beyer & Weaver, LLP

[57] ABSTRACT

The invention is a method and apparatus for dynamically loading a gateway server into a client machine if one is needed for the client machine to communicate directly with a program in another domain. In brief summary, when a new machine receives an object reference, this new machine must determine whether it can use the object reference as is for further communications or whether it must try to modify the object reference before using it. The new machine makes this determination by seeing if the front handle of the object reference points to a gateway object that is located on the new machine. If so, then the new machine can use the object reference as is. If the front handle pointer indicates that the designated gateway object is on another machine, then the task is to find or create a new gateway object on the new machine for use in further communications and to modify the object reference accordingly.

11 Claims, 7 Drawing Sheets

AN OBJECT REFERENCE TO A SERVICE BEHIND A GATEWAY

METHOD AND APPARATUS FOR ACCESS TO REMOTE GATEWAY SERVERS

BACKGROUND OF THE INVENTION

1. Field of the Invention

This invention relates to the field of distributed computing systems, and object-oriented programming. More specifically, the invention is a method and apparatus for minimizing telecommunications bottle-necks when one network domain communicates with a different type domain.

2. Background

It is desirable that efficient communications be enabled when communicating between heterogeneous computer system domains (for example, between an object-oriented domain and a non-object legacy software domain).

The growth of the internet and large company intranets have generated a need for communications to be put in place between heterogeneous computer systems/networks, such as UNIX™ based systems, and Windows based systems, etc. Moreover the adoption within these networks of object-oriented systems creates a new computing domain to add to the mix of different domains which would like to communicate with each other. In object-oriented systems, pointers to object implementations (often called "handles") can be passed from one Client to another Client creating some need to optimize these handles with respect to the communications path they use.

More recently, a new computing paradigm, known as the JAVA™ system developed by Sun Microsystems™, Inc., is predicated on both a need and an efficient mechanism for passing programs (sometimes called "Applets™") transparently between heterogeneous computer platforms. (UNIX is a registered trademark in the United States and other countries, exclusively licensed through X/Open Company, Ltd. JAVA and Sun Microsystems are trademarks of Sun Microsystems, Inc.)

In the past, attempts have been made to minimize the communications traffic between Clients which use handles to point to an object (also called "an object implementation"), especially where these object handles may be passed from one Client to another Client. Solutions to this problem have generally occurred within a single computing domain. That is, solutions to this problem have been found where the computer systems involved in the particular network in question all implemented the same object protocol. For example, U.S. Pat. No. 5,287,507 issued Feb. 15, 1994 ("Hamilton et al") assigned to Sun Microsystems, Inc. and titled "Method and Apparatus for Portable Object Handles that use Local Caches" (and incorporated fully herein by reference) teaches a mechanism whereby a network object handle can be used to reference both a server (the object implementation) and a local cache manager. When the network object handle is sent to another client, the handle is automatically updated to use a cache manager local to the receiving client, or if none is available the handle is updated to point directly to the server rather than communicate through the first client to the server. This process works well to minimize the communications path from the client holding the handle to the server, but it only works in a domain where all computer systems holding the clients and servers are using the same object protocol. Where one has a first domain like this which must communicate across heterogeneous domain boundaries, it is no longer possible to elect to point directly to the server when the server is in one domain and the client is in a second domain which is different from the first domain. This would be like speaking French to a person who only understands German. Thus there usually must be some intermediate mechanism between the calling client and the program in the different domain, wherein the intermediate mechanism can translate between the communications protocol of the calling client and the protocol of the called program.

An attempt to solve this problem, in which heterogeneous domains must communicate with each other, was to install a "gateway server" on one machine, say an object-oriented machine, the gateway server being an object having methods which would convert an object-oriented request from a client using the aforementioned handle, into a message protocol format understood by the second domain. Consider the following example, referring to FIG. 1 which shows a machine A 102 in one computing domain and shows in another domain, machine B 104 and machine C 106. The domain boundary is illustrated by line 120. Machine B 104 and machine C 106 are in an object-oriented domain, whereas machine A 102 is in a second domain. Machine B 104 is shown having a Client B 108 which communicates with a Gateway Server 110 via communication path 112. In this case the Gateway Server 110 is an object which has a method that can convert an object-oriented call into a different format that machine A 102 can understand. This communication is via communication paths 114 and 116. If Client B 108 passes the handle to the Gateway Server 110 to Client C 118 on Machine C 106, and if Machine C 106 has no Gateway Server 110 similar to the one on Machine B 104, then Client C 118 has no choice in communicating to Machine A 102 except that of going through the Gateway server 110 on Machine B 104. Consider now a more specific example, with reference to FIG. 1 which should make this more clear. An NFS server machine A 102 provides access to NFS files. If a Spring object-oriented machine B 104 has a gateway server 110 that converts between NFS operations and Spring file operations, then any program (such as Client B 108 or Client C 118) on Spring machines B 104 and C 106 can use the NFS files exported by machine A 102. ("Spring" is an internal code name used by Sun Microsystems, Inc. to designate a micro-kernel based object-oriented operating system developed in recent years. Spring is described in some detail in U.S. patent application Ser. No. 08/554,794 filed Nov. 7, 1995 now U.S. Pat. No. 5,577,251 (a continuation of Ser. No. 07/995,863 filed Dec. 21, 1992) in group art unit 2317, by Graham Hamilton et al titled "A Method & Apparatus for Subcontracts in Distributed Processing Systems" and which is incorporated fully herein by reference.)

The present invention is a method and apparatus to determine whether it is appropriate, and if so, to automatically interpose a gateway server between an object-oriented program or client and a computer system in another domain, so as to avoid an indirect communications path (path 119 in FIG. 1 for example) through some other machine in its same domain. Consider FIG. 2. If machine C 106 also has a gateway server 122, and if a program (say Client C 118) on machine C 106 obtains a reference to a file from the gateway server 110 on machine B 104, this invention will automatically interpose the gateway server 122 on machine C 106 between the client C 118 and server 110 on machine B 104. The interposed gateway server will convert and forward operation calls on the object reference directly to the NFS server on machine A 102 via communications paths 126 and 128, thereby reducing by half the network traffic required for file access by the program on machine C. If the machine C 106 does not have a gateway server, this invention provides a mechanism to automatically create the desired gateway server on machine C 106. As will be explained in more detail below, the entities designated "Gateway Servers" above may be JAVA classes which are dynamically loaded when needed because some client on a distant machine has passed an object reference to a current machine wherein the front object handle references a machine in another unknown domain.

SUMMARY OF THE INVENTION

The present invention overcomes the disadvantages of the above described communications problem by providing an economical, high performance, adaptable system and method for dynamically interposing a Gateway Server between a program on a machine in one domain and a machine in a different domain. The invention is a method and apparatus for dynamically loading a gateway server into a client machine if one is needed and is deemed appropriate, for the client machine to communicate directly with a program in another domain. In brief summary, when a new machine receives an object reference, this new machine must determine whether it can use the object reference as-is for further communications or whether it must try to modify the object reference before using it. The new machine makes this determination by seeing if the front handle of the object reference points to a gateway object that is located on the new machine. If so, then the new machine will use the object reference as is. If the front handle pointer indicates that the designated gateway object is on another machine, then in most cases, it would be advantageous to create a new gateway object on the new machine, and the task is to find or create a new gateway object on the new machine for use in further communications and to modify the object reference accordingly.

In one aspect of the invention, a programmable apparatus for performing dynamic loading of a gateway program whenever one is needed to communicate from a local machine in one domain to a remote program in a different domain. This programmable apparatus having a local computer in a first domain and a communications connection to a plurality of other computers including at least one computer in a second domain containing a remote program, and the programmable apparatus also having a mechanism in the local computer configured to determine whether a local gateway program exists on the local computer for communicating with the remote program or whether the local computer must try to locate and load a new gateway program on the local computer if the local computer has resources to accommodate it.

In another aspect of the invention an article of manufacture is claimed which includes a computer readable medium, with a computer program mechanism embedded therein for causing a computer in a first domain to dynamically obtain a gateway program for use in communicating with a remote program in a second domain.

In yet another aspect of the invention, a computer implemented process is claimed for performing dynamic loading of a gateway program into a machine in a first domain to permit communications with a remote program in a second domain.

DESCRIPTION OF THE DRAWINGS

The objects, features and advantages of the system of the present invention will be apparent from the following description in which.

NOTATIONS AND NOMENCLATURE

Figure 1:
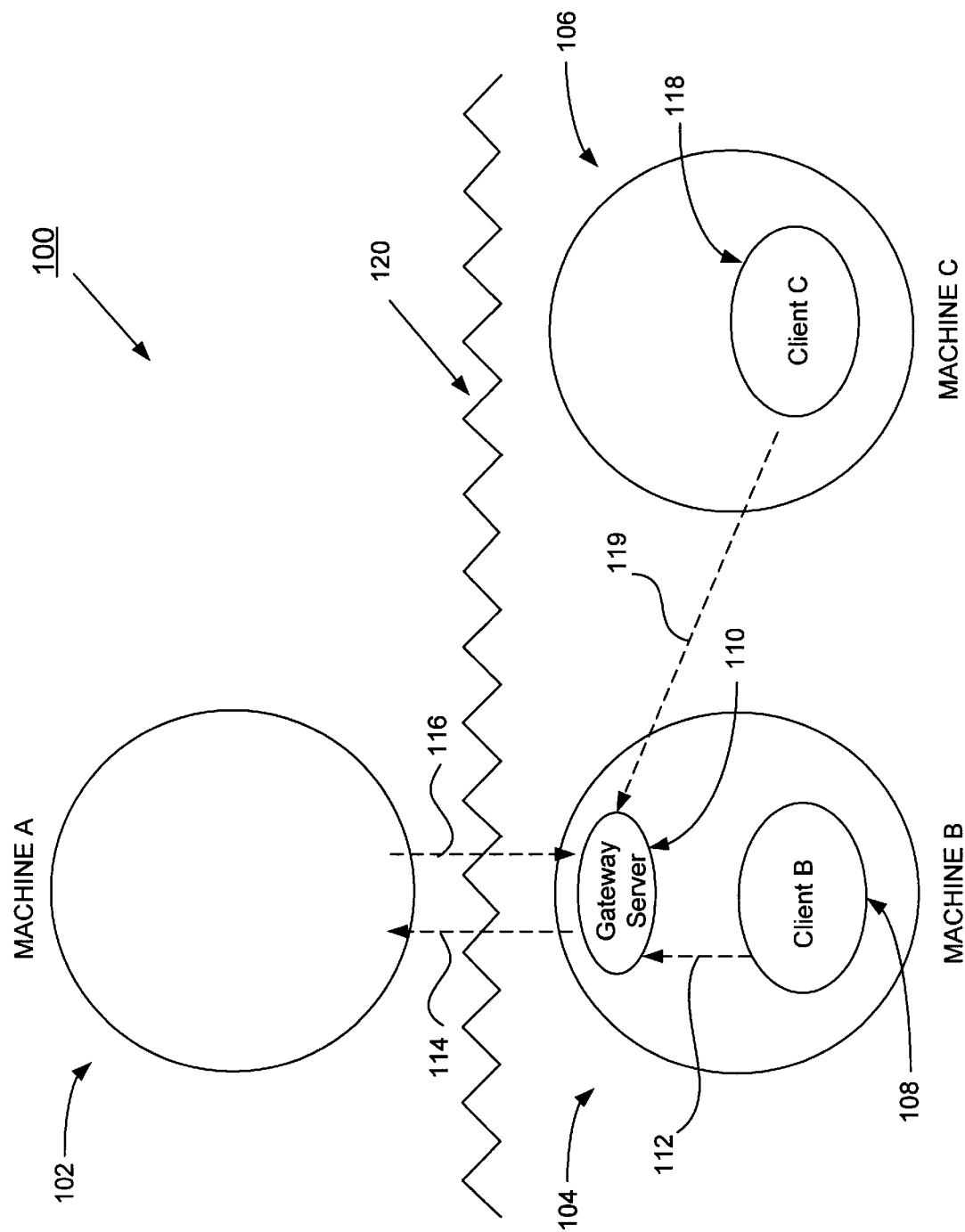
FIG. 1 illustrates a network of heterogeneous computer systems, wherein only one of a plurality of Object-oriented machines has a gateway server to permit communications to flow to and from the object-oriented clients to the non-object oriented machine.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

A method and an apparatus are disclosed for client programs in one domain to communicate and use references to objects in communicating with a different (possibly non-object) domain, in a way which improves the benefits of local machine direct communication across these different domains. In the following description for purposes of explanation, specific data and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Operating Environment

Figure 3:
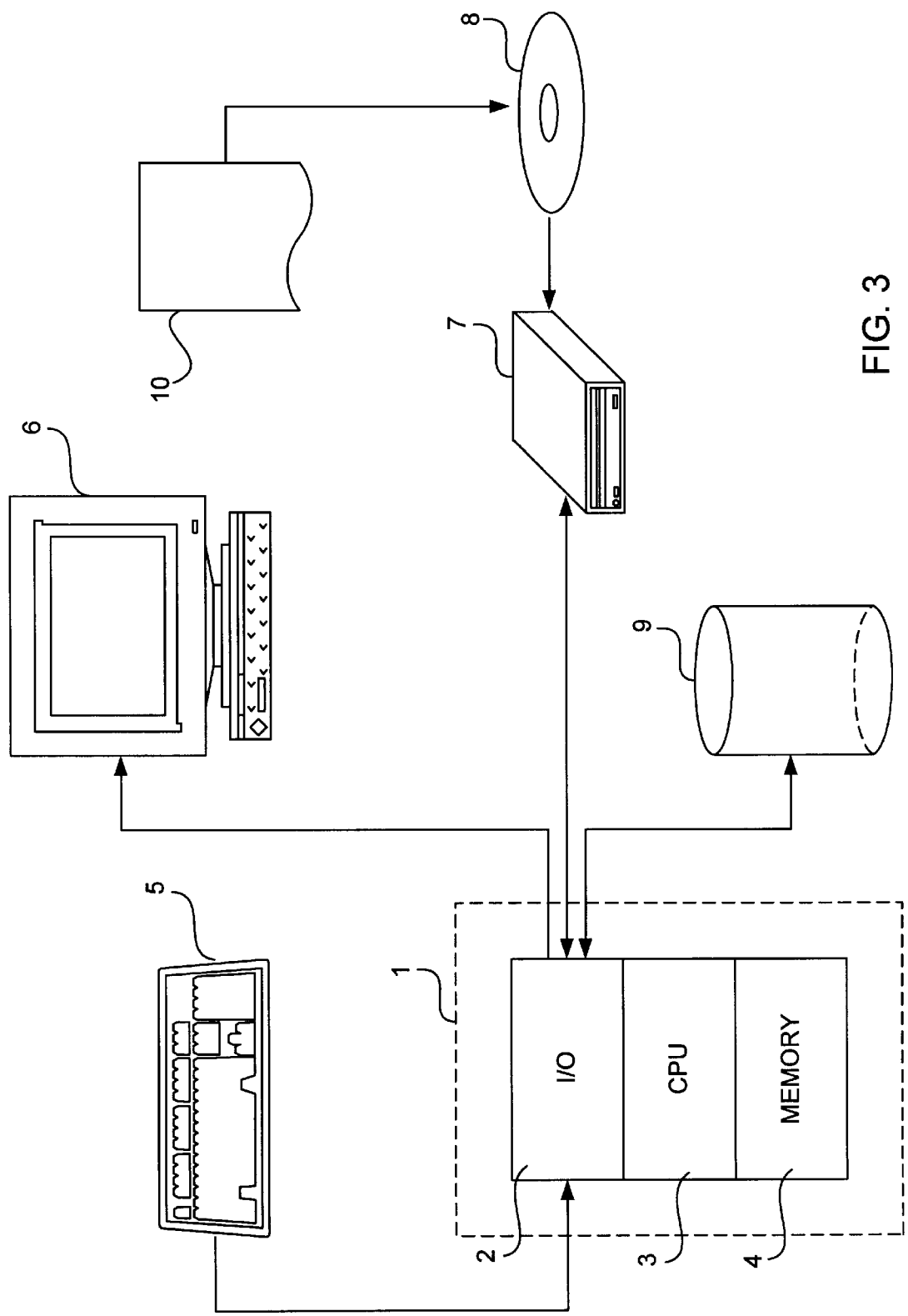
FIG. 3 illustrates a portion of a computer, including a CPU and conventional memory in which the present invention may be embodied.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 3, wherein a processor 1 is shown, having an Input/output ("I/O") section 2, a central processing unit ("CPU") 3 and a memory section 4. The I/O section 2 is connected to a keyboard 5 a display unit 6, a disk storage unit 9 and a CD-ROM drive unit 7. The CD-ROM unit 7 can read a CD-ROM medium 8 which typically contains programs 10 and data.

Glossary of Terms

Machine
 The terms "machine" or "address space" are used interchangeably below. In the Java terminology, they would be Java Virtual Machines.
JAVA
 The term JAVA refers to the Sun Microsystems, Inc. system that includes its own language; a compiler which compiles JAVA source code into byte codes which represents a JAVA virtual machine; and a run-time interpreter which can be made to reside on any computer which can translate the JAVA byte codes into a run-time object code for the particular computer. More detailed definitions and descriptions of JAVA and related products can be found on the Internet at "http://www.javasoft.com/allabout.html".
Object Reference
 a reference to a (remote) object. In our case it contains a handle to a gateway object, a name for a gateway server plus a cookie/handle. An object reference is passed as a unit. When passed within an address space (virtual machine), it is passed unmodified. When passed from one address space to another, the original object reference may be used to obtain the new object reference. Object invocation is performed using the information in the object reference. See FIG. 7 for an illustration of the object reference configuration used in the present invention.
Object Handle
 this term is used to describe the information needed to determine the machine where the remote object lives and the object in it.
Service
 A service that is to be provided to object-oriented domains. A good example would be an NFS (Network File System) server.
Service Cookie (Handle)
 an identification of (i.e. pointer to) the service that is being translated (addressed) by a gateway.
Gateway Object
 an object that is providing a gateway translation for some service. A gateway object has a pointer back to its Gateway Service Manager which is in the same machine.
Gateway Service (aka Name of Gateway)
 A name identifying the type of gateway to be used. For example, it would be something like "NFSGateway" to identify a service providing a gateway to an NFS server.
Gateway Service Manager (aka Gateway Manager)
 an object that manages and creates all the gateway objects of a given type. It lives in the same machine as the gateway objects it creates.
Local Gateway Manager Mapper (aka Local Manager)
 this is an object that provides a mapping from references to Gateway Managers. The gateway managers may be in the same machine as the Local Manager, or on a different machine.
Manager Description
 A description that uniquely identifies the type of a gateway manager. This description is enough to determine whether an object satisfies it and also can be used to obtain code to create new instances of this type.

Additional Background

The preferred embodiment of the invention disclosed herein makes use of techniques for identifying object references disclosed in U.S. patent application Ser. No. 08/636,707 filed on Apr. 23, 1996 now U.S. Pat. No. 5,815,709 titled "System & Method for Generating Identifiers For Uniquely Identifying Object Types for Objects Used In Processing of Object-Oriented Programs And The Like" by James H. Waldo, Krishna Bharat and Roger Riggs which is hereby fully incorporated herein by reference.

The Problem

Figure 4:
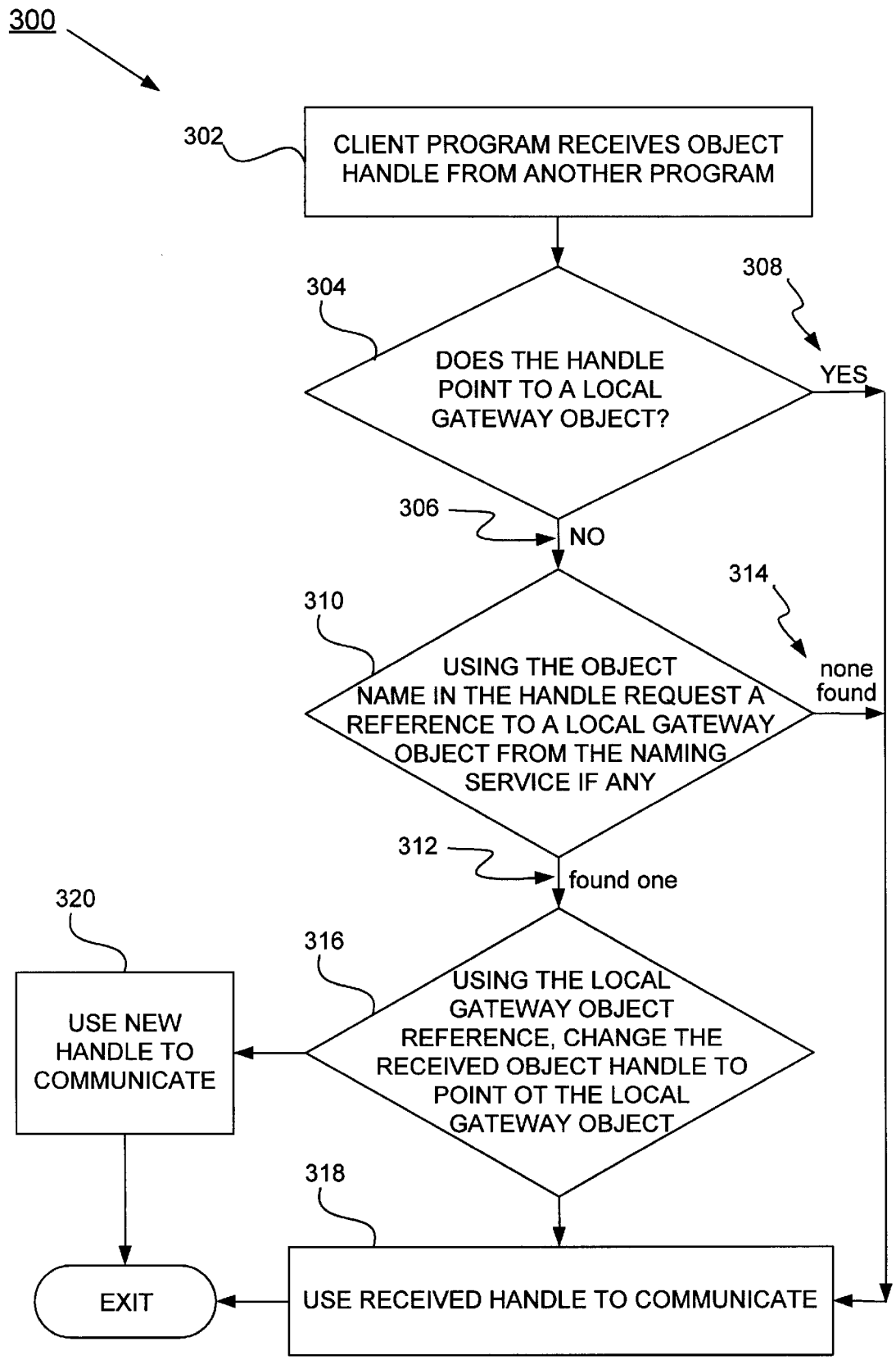
FIG. 4 illustrates a flow chart of the logic process used in a machine when it obtains a new client handle from some other machine in a heterogeneous computer network as implemented without dynamically incorporating a new gateway server.
Figure 5:
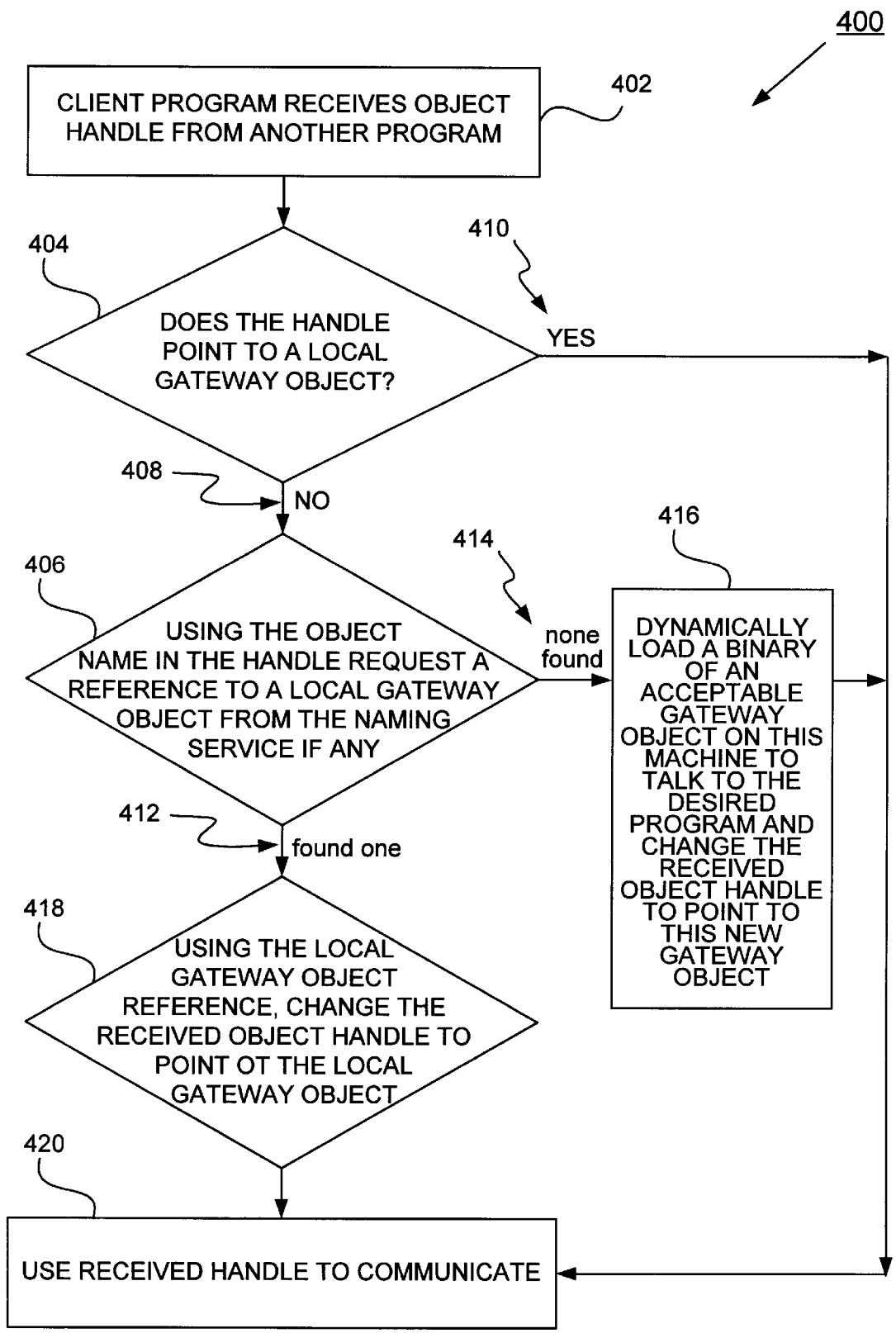
FIG. 5 illustrates a flow chart of the logic process used in a machine when it obtains a new client handle from some other machine in a heterogeneous computer network including the invocation of a new gateway server.

The technical problem arises when a client machine receives an object handle from some other machine in the same domain, where the object handle is used to point to a gateway server to communicate to a program in a different domain. Consider a system which does not have the dynamic loading capability of the preferred embodiment. Referring to FIG. 4, a client program receives an object handle from another program 302. A test is made to see if this object handle points to a gateway object on the local machine 304. If so 308 then this object handle is used for future communications to the remote program 318. If the object handle does not point to a local gateway server 306 a request is made to a local naming service to see if a local gateway object is present 310. If none is found in the local machine 314 then the object handle as received is used for any further communications to the remote program 318. Note that in this instance the communication path is from the local machine to the gateway object on the machine from whence the object handle was received and thence to the remote program, a doubling of the communication path. This is the situation shown in FIG. 1 where client C 118 communicates via path 119 to the gateway 110 on machine B 104. If the local naming service does find a local gateway object 312 then the received object handle is changed to point to the local gateway object 316 and direct communications may proceed thereafter using the new handle 320.

Generalizing the Problem

Figure 2:
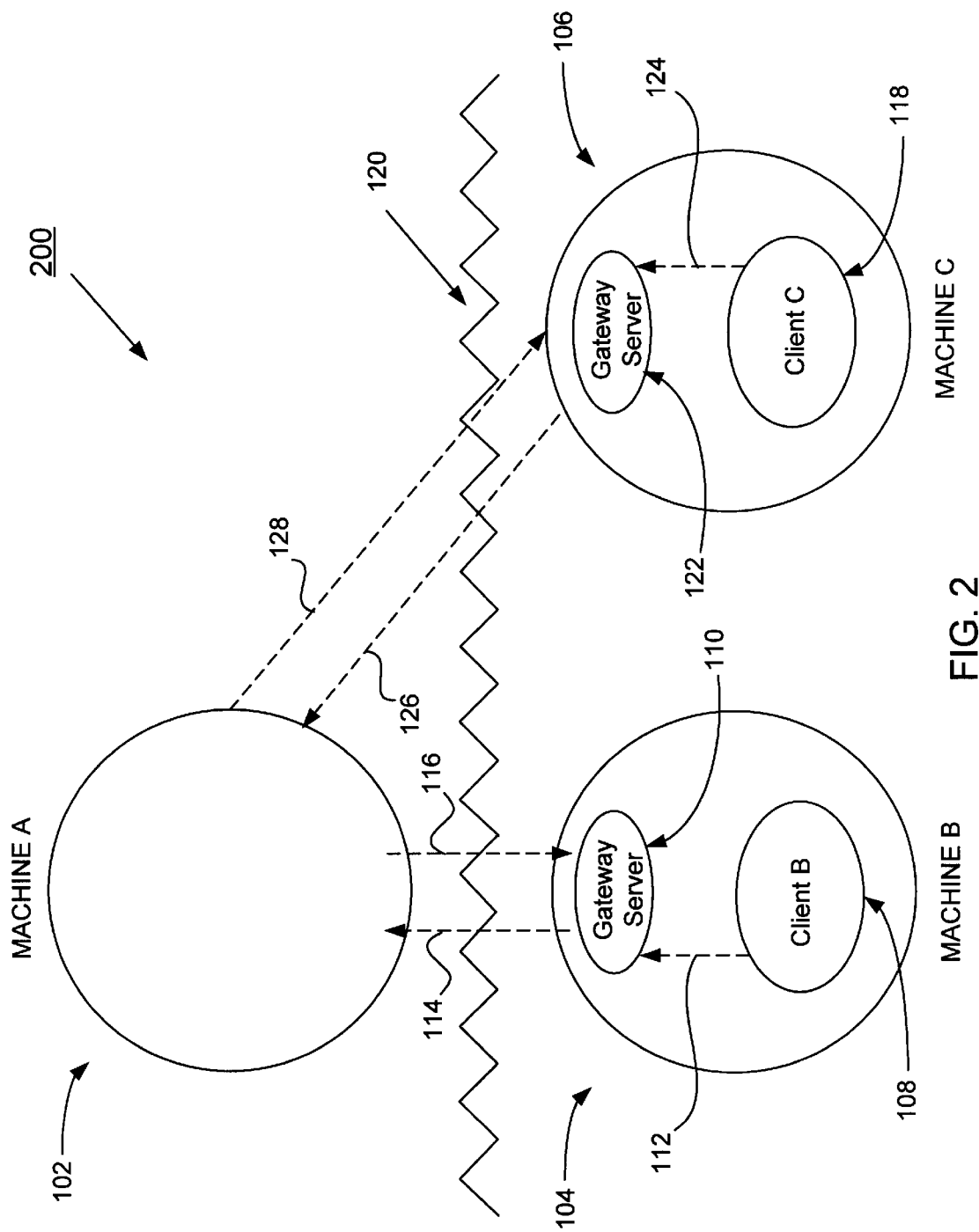
FIG. 2 illustrates a network of heterogeneous computer systems, similar to that of FIG. 1 but wherein all of the object-oriented machines have a gateway server in accordance with the present invention.
Figure 6:
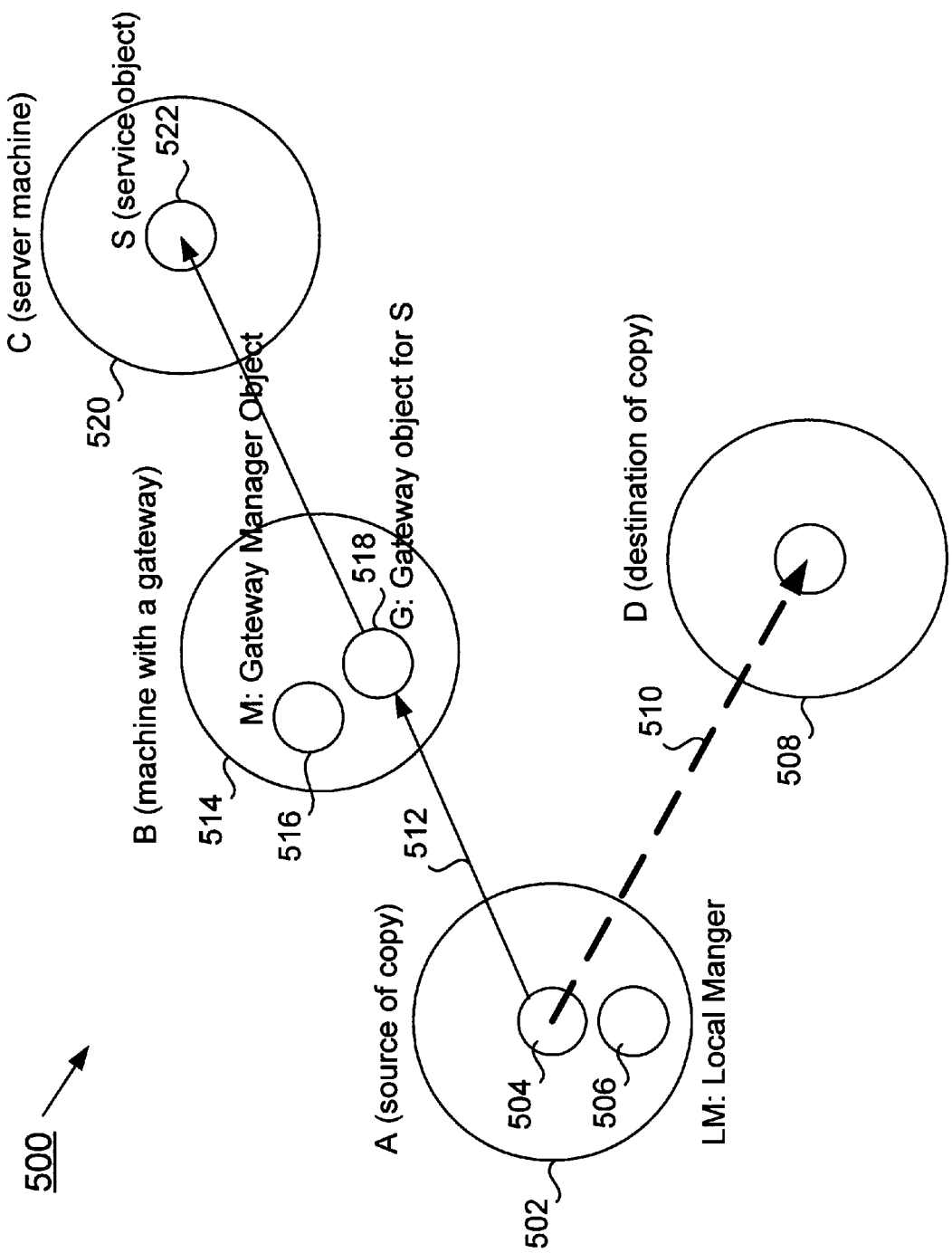
FIG. 6 illustrates a more generalized description of the problem environment which spans heterogeneous domains.

Before illustrating the preferred embodiment of the process to dynamically load the gateway when needed, a more precise description of the general problem environment is shown in FIG. 6. This description generalizes the problem illustrated in FIGS. 1 & 2. Referring now to FIG. 6, the more general case of the problem is illustrated where the gateway is initially in a machine different than the one holding the object handle. In machine (address space) A 502 we have an object reference R 504 to a service that is implemented by a server object S 522 in a different domain C 520 through the facilitation of a gateway object (program) G 518 running on machine B 514. In this general case the Gateway Manager Object M 516 is also located on machine B 514. It is desired to pass object reference R 504 from machine A 502 to machine D 508 wherein machine D 508 can continue invoking the service S 522 while minimizing the communications path. Since in some cases, minimizing resource consumption may be more important than minimizing communications paths, it is desirable to have flexibility in the location of the gateway objects.

The Invention

The invention is a method and apparatus for dynamically loading a gateway server into a client machine if one is needed and desired, for the client machine to communicate directly with a program in another domain. The following describes how the invention works and is used, and therefore how it may be made. In brief summary, when a new machine receives an object reference, this new machine must determine whether it can use the object reference as is for further communications or whether it must try to modify the object reference before using it. The new machine makes this determination by seeing if the front handle of the object reference points to a gateway object that is located on the new machine. If so, then the new machine can use the object reference as is. If the front handle pointer indicates that the designated gateway object is on another machine, then the task is to find or create a gateway object for use in further communications and to modify the object reference accordingly. This gateway object may be local to the new machine (to reduce communications costs) or not (to reduce memory/ cpu usage). The task of finding or creating a new gateway object is described below. It involves a determination of whether a Gateway Manager already exists local in this machine, and if not, evaluating the resources needed to create a Gateway Manager in the context of the resources currently available in the local machine.

Object References in the Invention

Figure 7:
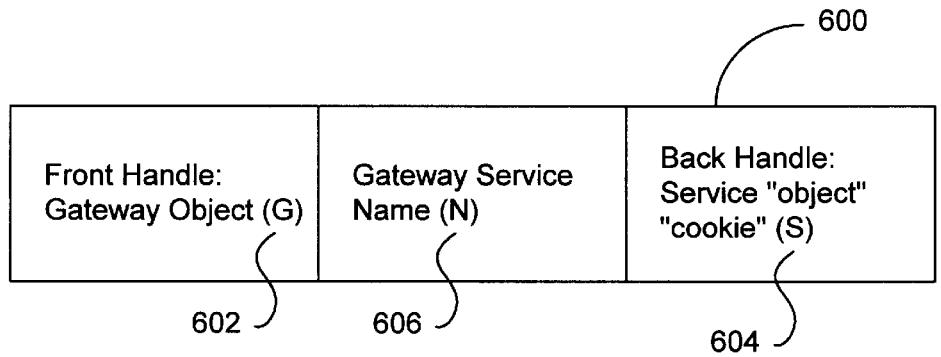
FIG. 7 illustrates an exemplary Object Reference R containing a front Handle G which points to a Gateway Object.
Figure 8:
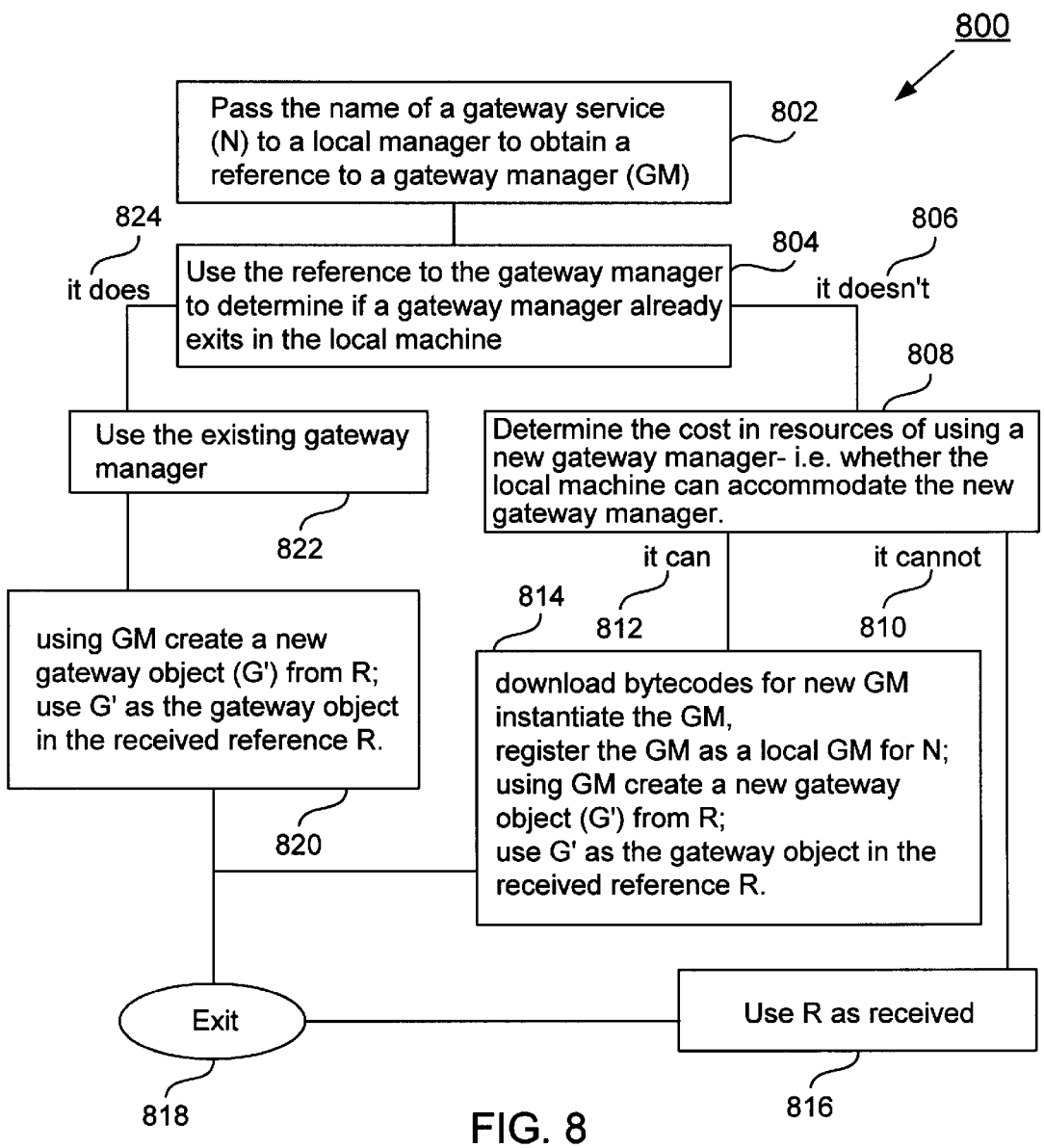
FIG. 8 illustrates a flow chart of the logic process used in block 416 in FIG. 5 which performs the task of invoking a new gateway object.

The preferred embodiment represents an object reference as two object handles and a name. Referring to FIG. 7 an Object Reference R 600 comprises two handles and a name: a front handle which points to a Gateway Object G 602, a Gateway Service Name 606 and a back handle which points to the service object S 604. This structure is similar to the cachable handles from U.S. Pat. No. 5,287,507 (portable object handles that use local caches) referred to above. In the present invention however, the front object handle points to a Gateway Object G and the back handle points to the actual service object S. The Gateway Service Name describes the gateway service involved.

Invocation on an Object Reference

To invoke a method on an object represented by an object reference R (for example, 504 in FIG. 6), the front object handle is used. The back handle (which may be best described as a cookie, as the service may not be object-oriented at all) is only involved when the reference is passed across machines. Unlike U.S. Pat. No. 5,287,507, there are no invocations through the back handle as it is assumed that the service provided by S is not directly useable by the client (because they are in different domains). The process for obtaining the first gateway manager object is well known in the art (for example, by resolving a name in a name service).

Passing Object References

The following describes the process upon receiving an object reference, first in pseudo code and then more descriptively.

Assume the object reference R contains a reference to a gateway object G, a gateway service name N, and a cookie S (the cookie S is not used directly, as reference R is instead passed around between clients).

```
if G is local
then
    use R as received
else
    if there is a local gateway manager GM for N
    then
        let G' be the new gateway object returned by GM from R.
        use G' as the gateway object in the received reference.
    else
        get the cost C of a gateway manager for N
        if C < resources available locally
        then
            download the bytecodes for GM
            instantiate the GM
            register GM as a local Gateway Manager for N.
            let G' be the new object
            gateway returned by GM from R.
            use G' as the gateway object in the received reference R.
        else
            use R as received.
        endif
    endif
endif
```

It is assumed that there is a registration service in each machine that provides, for a given service name N: (1) either a gateway manager for N that is local to the machine or an indication that there is none locally; (2) a reference to the bytecodes that would be used to implement the gateway manager; and (3) a description of the cost of such a gateway manager (i.e. the resources used to have a gateway locally). For example, the cost of a gateway manager could be the memory required to run it.

Referring again to FIG. 6, when a reference R 504 is received in machine D 508, the following process happens. First the front handle of R 602 in FIG. 7, is checked to determine whether it refers to a gateway object in machine D 508. If so, then R 504 is used unmodified in machine D 508. If the front handle refers to some other machine (as in FIG. 6 R points to machine B 514), then additional processing is required to determine the cost of having a local gateway object and if appropriate, to try to create one. This is done as follows.

The next step is to check, using the name N identifying the gateway service (606 in FIG. 7), in a registration service (a table in the simplest implementation) if there is a gateway manager GM in the receiving machine D 508. If there is, then the received reference R would be passed to this GM to obtain a gateway object G'. Then G' would replace G in R (602 in FIG. 7) to produce the object reference 600 to use in machine D 508.

If there is no gateway manager in the receiving machine D 508, then a description is obtained of the cost that would be required to instantiate a gateway manager in machine D. For example, this cost could be the memory requirements for the bytecodes describing the manager, plus some additional cost to run it. This cost description would be obtained from a registration mechanism, indexed, again by the name N 606 in FIG. 7. This cost is now compared with the resources available locally in machine D 508. If there are not enough resources available, then the object reference R is used as is, accepting the additional communications costs as required.

Creation of Gateway Managers

The creation of a Gateway Manager is based on a manager descriptor. There are several useful mechanisms to describe managers. They are based in the fact that Java code has a portable format (java bytecodes) and that Java machines can dynamically load these bytecodes. The bytecodes describing a class can be stored in an object that is identified by a name provided by a name service. A common example in the internet is a Uniform Resource Locator (URL); another example, applicable to a situation where a file system is available, would be a file name. To guarantee consistency, a class can be fingerprinted; a fingerprint is a number (or a collection of numbers) that statistically uniquely identify a class. That is, there is a very low probability that two classes that are actually different will have the same fingerprint. (See the aforementioned U.S. patent application Ser. No. 08/636,707 filed on Apr. 23, 1996 titled "System & Method for Generating Identifiers For Uniquely Identifying Object Types for Objects Used In Processing of Object-Oriented Programs And The Like" by James H. Waldo, Krishna Bharat and Roger Riggs which is also hereby fully incorporated herein by reference.)

Given these techniques, a Gateway Manager Identifier can be "the name of its class, its fingerprint, and a URL to access the bytecodes if needed." The method used to instantiate an object from this class is as follows: first the name is used to determine whether the receiving machine has a class with that name; if it is not present, the URL is used to load the bytecodes for the class. If it is present, its fingerprint is computed and compared with the fingerprint sent; it they disagree an error is raised. Once the Gateway Service Manager is thus created on the new machine, then it can be used to create a new Gateway Object on the new machine as described above.

Having described the invention in terms of a preferred embodiment in an object oriented architecture, as well as alternative embodiments, it will be recognized by those skilled in the art of computer systems design that various changes in the structure and programming of the implementations described can be made, including the application of the invention in other operating systems architectures and domains, without departing from the spirit and scope of the invention which is measured by the following claims.

What is claimed is:

1. A programmable apparatus for performing dynamic loading of a gateway program whenever said gateway program is needed in a local machine to communicate directly with a remote program, comprising:

a programmable local computer residing in a first domain and having a processor, a memory, an operating system, a communications connection to a plurality of other computers, at least one of said other computers residing in a second domain having a different operating system and containing said remote program;

a computer program mechanism in said programmable local computer configured to determine whether a local gateway program exists on said programmable local computer and if so to use a reference to said local gateway program to communicate directly with said remote program, and if not, to communicate with a second computer in said first domain to determine whether a new gateway program is available for loading into said programmable local computer and if so, to dynamically load said new gateway program into said programmable local computer to be used to communicate with said remote program.

2. The programmable apparatus of claim 1 wherein the gateway program is an object-oriented program.

3. The programmable apparatus of claim 1 wherein said computer program mechanism is triggered to make said determination automatically upon the receipt of a reference handle by said first programmable computer from another computer in said first domain.

4. The programmable apparatus of claim 1 wherein said computer program mechanism comprises a selection mechanism configured to determine whether said first programmable computer has resources available to accommodate said new gateway program and if so, to load said new gateway program into said first programmable computer.

5. The programmable apparatus of claim 1 wherein said computer program mechanism further comprises:

a first determination mechanism configured to pass a name of a gateway manager to a local manager to obtain a reference to said gateway manager;

a second determination mechanism coupled to said first determination mechanism, said second determination mechanism being configured to use said reference to said gateway manager to determine whether said gateway manager already exists in said first programmable computer or whether said new gateway manager must be created for loading into said first programmable computer, and a third determination mechanism coupled to said second determination mechanism, said third determination mechanism being configured to determine whether said first programmable computer has resources sufficient to accommodate said new gateway manager, and if so said third determination mechanism being further configured to:

download bytecodes for said new gateway manager, instantiate said new gateway manager, register said new gateway manager as a local gateway manager for communicating with said remote program in said second domain, obtain a new gateway program from said new gateway manager, and use said new gateway program to communicate with said remote program in said second domain.

6. An article of manufacture for causing a computer to perform dynamic loading of a gateway program whenever said gateway program is needed in a local machine in a first domain to communicate directly with a remote program residing in a machine in a second domain, comprising:

a computer-readable storage medium;

a computer program stored in said storage medium;

the storage medium, so configured by said computer program to cause a programmable local computer in said first domain to determine whether a local gateway program exists on said programmable local computer and if so to use a reference to said local gateway program to communicate directly with said remote program in said second domain, and if not to communicate with a second computer in said first domain to dynamically load a new gateway program into said programmable local computer which can be used to communicate with said remote program, if said programmable local computer has resources to receive said new gateway program.

7. A computer-implemented process to perform dynamic loading of a gateway program whenever said gateway program is needed in a computer located in a first domain having a first communications protocol to communicate with a remote program residing on a computer in a second domain having a second communications protocol, comprising the steps of:

receiving on said first computer located in said first domain a reference handle from a second computer located in said first domain, said reference handle containing a value which points to a gateway program which is capable of communicating with said remote program located in a second domain;

determining whether a local gateway program exists on said first computer and if so using a reference to said local gateway program to communicate directly with said remote program, and if a local gateway program does not exist on said first computer, dynamically loading a new gateway program into said first computer which can be used to communicate with said remote program.

8. The computer-implemented process of claim 7 wherein the gateway program is an object-oriented program.

9. The computer-implemented process of claim 7 wherein the step of determining whether a local gateway program exists on said programmable local computer is triggered to make said determination automatically upon the receipt of a reference handle by said programmable local computer from another computer in said first domain.

10. The computer-implemented process of claim 7 wherein the step of determining whether a local gateway program exists on said programmable local computer comprises the additional steps of:

determining whether said programmable local computer has resources to accommodate a new gateway program if is available and if so, loading said new gateway program into said programmable local computer.

11. The computer-implemented process of claim 7 wherein the step of determining whether a local gateway program exists on said programmable local computer comprises the additional steps of:

passing a name of a gateway manager to a local manager to obtain a reference to a gateway manager;

using said reference to a gateway manager to determine whether a gateway manager already exists in said programmable local computer or whether a new gateway manager must be created for loading into said programmable local computer; and determining whether said programmable local computer has resources available to accommodate said new gateway manager, and if so downloading bytecodes for said new gateway manager, instantiating said new gateway manager, registering said new gateway manager as a local gateway manager for communicating with said remote program in said second domain, obtaining a new gateway object from said new gateway manager, and using said new gateway object to communicate with said remote program in said second domain.

* * * * *